(12) United States Patent
Kobayashi

(10) Patent No.: US 8,174,516 B2
(45) Date of Patent: May 8, 2012

(54) IMAGE DISPLAY SYSTEM, IMAGE SIGNAL TRANSMITTER AND IMAGE DISPLAY UNIT

(75) Inventor: Reiichi Kobayashi, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 462 days.

(21) Appl. No.: 12/448,136

(22) PCT Filed: Feb. 26, 2008

(86) PCT No.: PCT/JP2008/053724
§ 371 (c)(1),
(2), (4) Date: Aug. 13, 2009

(87) PCT Pub. No.: WO2008/108321
PCT Pub. Date: Sep. 12, 2008

(65) Prior Publication Data
US 2009/0315871 A1    Dec. 24, 2009

(30) Foreign Application Priority Data

Feb. 26, 2007   (JP) .................................. 2007-045634

(51) Int. Cl.
*G09G 5/00* (2006.01)
(52) U.S. Cl. ........................... 345/208; 345/94; 345/204
(58) Field of Classification Search .............. 345/51–56, 345/87–100, 208–214
See application file for complete search history.

(56) References Cited

U.S. PATENT DOCUMENTS

| | | | | |
|---|---|---|---|---|
| 5,515,049 A | * | 5/1996 | Yamauchi | 341/155 |
| 6,912,247 B2 | * | 6/2005 | Miyashita et al. | 375/228 |
| 7,505,084 B2 | * | 3/2009 | Kobayashi et al. | 348/625 |
| 7,667,676 B2 | * | 2/2010 | Aoki | 345/87 |
| 7,893,908 B2 | * | 2/2011 | Morimoto et al. | 345/94 |

FOREIGN PATENT DOCUMENTS

| | | |
|---|---|---|
| JP | 8-331419 | 12/1996 |
| JP | 2000-305506 | 11/2000 |

* cited by examiner

*Primary Examiner* — Richard Hjerpe
*Assistant Examiner* — Mansour M Said
(74) *Attorney, Agent, or Firm* — McGinn IP Law Group, PLLC

(57) ABSTRACT

An object of the present invention is to realize a transmission distortion correction system for allowing an image signal including a plurality of picture signals to be corrected, and to realize an image signal transmitter and an image display unit. The image display unit of the present invention includes: a second reference signal generation means for generating a second reference signal similar to a first reference signal regarding the image signal in which the first reference signal is inserted into each of the plurality of picture signals by the image signal transmitter; a plurality of waveform equalizers provided that correspond to the plurality of picture signals and that include a filter circuit capable of setting a characteristic thereto; and a control portion for inputting the plurality of picture signals, analyzing a characteristic of a transmission path between the image signal transmitter and the image display unit upon detecting the first reference signal in the input picture signals by comparing the first reference signal with the second reference signal, and setting a characteristic inverse to the analyzed transmission path characteristic to a filter circuit of the waveform equalizers that correspond to the input picture signals.

17 Claims, 13 Drawing Sheets

(a)

(b)

(c)

(d)

IMAGE DISPLAY SYSTEM, IMAGE SIGNAL TRANSMITTER AND IMAGE DISPLAY UNIT

TECHNICAL FIELD

This invention relates to an image signal transmitter, an image display unit for displaying image based on an image signal transmitted by the image signal transmitter and a system composed of these, and particularly to an image signal transmitter for correcting waveform degradation of an analog image signal caused by a transmission path, and to an image display unit and a system composed of these.

BACKGROUND ART

In a system including an image signal transmitter and an image display unit for displaying images based on an image signal transmitted by the image signal transmitter, the image signal is often transmitted through a cable connecting the image signal transmitter and the image display unit. When an analog image signal is transmitted through the cable, the image signal degrades depending on the cable characteristics or a cable length, and correction becomes necessary.

Frequency degradation which is caused by transmission through a cable is corrected by transmitting an image signal to provide a reference, comparing it with an image signal that is included inside of a receiver, as a reference to acquire frequency degradation that is produced in a transmission path, and emphasizing a high-frequency component. There is such an image display unit disclosed in Patent Document 1 (Japanese Patent Laid-Open No. 08-331419).

The image display unit disclosed in Patent Document 1 uses, as a reference signal for waveform equalization, an impulse signal including a roll-off rate of 10% and that is superimposed during a vertical retrace line interval of an image signal, carries out a correlation computation using an ideal impulse signal in a time axis to successively correct a tap coefficient of a transversal filter, and thereby executes waveform equalization, and also measures a signal-to-noise (S/N) ratio of a signal to vary a high-frequency characteristic of the reference signal for waveform equalization corresponding to the S/N ratio.

However, the technique disclosed in Patent Document 1 is a technique used for broadcast radio, and because a band of an image signal transmitted by a transmitting end is limited, the technique cannot be directly applied to a system whose band is not limited such as, for example, an image signal output of a personal computer (PC).

The output image signal of a PC includes a signal including a different number of pixels for screen display such as Video Graphic Array (VGA), Super Video Graphic Array (SVGA), Extended Video Graphic Array (XGA) and Super Extended Video Graphic Array (SXGA), and also a signal including a different number of scanning frequencies (vertical frequency, horizontal frequency, dot clock) even when the signal has the same number of pixels for the screen display. As a technique that is intended to correct an image signal supplied from a PC, there is a technique disclosed in Patent Document 2 (Japanese Patent Laid-Open No. 2000-305506).

A display unit disclosed in Patent Document 2 calculates the pixel frequency of an image signal supplied from a PC, measures a characteristic of a transmission filter system by sampling at N points per pixel using a dot clock including a frequency N times as many as the pixel frequency, and passing through a digital filter including a filter coefficient defining an inverse characteristic to the transmission filter system set thereto, thereby reproducing the image signal.

[Patent Document 1] Japanese Patent Laid-Open No. 08-331419
[Patent Document 2] Japanese Patent Laid-Open No. 2000-305506

DISCLOSURE

The technique disclosed in Patent Document 1 is used as a broadcast radio technique, and because a band of an image signal transmitted by a transmitting end is limited, the technique cannot be directly applied to a system whose band is not limited such as, for example, an image signal output of a personal computer (PC). Further, because for broadcast use, the transmission characteristics of one signal (channel) are allowed to be corrected, and in a system in which an image signal including a plurality of picture signals such as RGB signals of a PC is transmitted, the difference in picture delay of each picture signal is not allowed to be corrected. The picture signal of each of the RGB signals is naturally transmitted through a separate cable, and further the picture signal has different contents. Regarding such signal, the technique disclosed in Patent Document 1 cannot correct the difference in picture delay produced from a difference in the characteristics or the length of each cable.

The technique disclosed in Patent Document 2 calculates the pixel frequency of an image signal supplied from a PC and uses it, so that the technique can correspond to various signals, but the image signal is reproduced when it passes through a digital filter, which has a filter coefficient set thereto that has an inverse characteristic to a transmission filter system whose characteristic is acquired by sampling at N points per pixel, and waveform reproduction is carried out, but degradation of an image signal that is caused by the transmission system, that is dependent on a frequency component, cannot be corrected.

An exemplary object of the present invention is to realize a transmission distortion correction system for allowing an image signal including a plurality of picture signals to be corrected, an image signal transmitter and an image display unit.

An image display unit of the exemplary embodiment of present invention has a first reference signal generation means for generating a first reference signal, the image displaying unit constitutes an image display system along with an image signal transmitter for inserting the first reference signal into each of a plurality of picture signals to be outputted as an image signal, inputs the image signal through a transmission path, and displays an image based on the image signal, the image display unit including:

a second reference signal generation means for generating a second reference signal similar to that of the first reference signal generation means;

a plurality of waveform equalizers provided corresponding to the plurality of picture signals and including a filter circuit capable of setting the characteristic of a transmission path thereto; and a control portion for inputting the plurality of picture signals, analyzing a characteristic of a transmission path between the image signal transmitter and the image display unit upon detecting the first reference signal in the input picture signals by comparing the first reference signal with the second reference signal, and setting a characteristic inverse to the analyzed characteristic of the transmission path to a filter circuit of the waveform equalizers corresponding to the input picture signals.

In this case, the first and second reference signals generated by the first and second reference signal generation means may include at least any one of a sweep signal, an impulse signal and a step signal.

Further, each of the waveform equalizers may include a noise reduction circuit for correcting degradation in S/N ratio due to the filter circuit.

Also, the filter circuit may be composed of a finite impulse response (FIR) filter.

Further, the filter circuit may be composed of an FIR filter and an infinite impulse response (IIR) filter.

Also, a waveform equalization circuit may include an A/D converter for converting the image signal into a digital signal to be outputted to the filter circuit, and the control portion may set a gain of G to the A/D converter, and apply a gain of 1/G to a filter coefficient of the filter circuit.

Further, the noise reduction circuit may have a variable correction amount, and the control portion may adjust the correction amount by using the noise reduction circuit corresponding to the characteristic set to the filter circuit.

Further, the waveform equalizer may include a memory portion for storing contents set to the filter circuit by the control portion, and the control portion may set contents to the filter circuit by using the contents stored in the memory portion.

Also, the control portion may perform sampling at a sampling frequency of n times as many as a sampling frequency of the image signal to acquire a correction frequency characteristic in order to execute waveform equalization, and subsequently may perform resampling to apply the correction frequency characteristic to the sampling frequency of the image signal.

Further, the control portion may acquire a correction frequency characteristic to execute waveform equalization up to one-half of a sampling frequency of the first reference signal, and the correction frequency characteristic beyond this may be acquired by interpolation.

Also, the control portion may have a memory portion for storing the correction frequency characteristic to execute waveform equalization, acquire the correction frequency characteristic beyond one-half of the sampling frequency of the reference signal by interpolation using the correction frequency characteristic stored in the memory portion when a frequency of the image signal becomes higher than that of the reference signal after setting the characteristic inverse to the analyzed transmission path characteristic to the filter circuit, directly apply the correction frequency characteristic up to one-half of the sampling frequency stored in the memory portion to the correction frequency characteristic up to one-half of the sampling frequency of the reference signal when the frequency of the image signal becomes lower than that of the reference signal, and execute waveform equalization using the correction frequency characteristic acquired in such a manner.

An image display system of the present invention includes an image signal transmitter for outputting an image signal including a plurality of picture signals, and an image display unit for inputting the image signal through a transmission path and displaying the image based on the image signal, in which the image signal transmitter has a first reference signal generation means for generating a first reference signal, and inserts the first reference signal into each of the plurality of picture signals to be outputte as the image signal, the image display unit includes:

a second reference signal generation means for generating a second reference signal similar to that of the first reference signal generation means;

a plurality of waveform equalizers provided corresponding to the plurality of picture signals and including a filter circuit capable of setting a frequency characteristic thereto; and a control portion for inputting the plurality of picture signals, analyzing a characteristic of a transmission path between the image signal transmitter and the image display unit upon detecting the first reference signal in the input picture signals by comparing the first reference signal with the second reference signal, and setting a characteristic inverse to the analyzed characteristic of the transmission path to a filter circuit of the waveform equalizers corresponding to the input picture signals.

In this case, the image signal transmitter may read a program stored in a portable recording medium to operate, image signal transmitter and generate the first reference signal.

Further, the image signal transmitter and the image display unit both may have a communication interface portion, the image signal transmitter may read a program stored in a portable recording medium to operate, image signal transmitter and generate the first reference signal, and transmit a command for a waveform equalization operation to the image display unit through the communication interface portion, and the control portion may perform the waveform equalization operation in response to the command.

Also, the image signal transmitter may include a first communication interface portion, the image display unit may include a second communication interface portion and an input means, and when the input means receives an input for a waveform equalization operation, the input means may transmit a command containing the contents to the control portion and the image signal transmitter through the first and second interface portions, and the image signal transmitter may generate the first reference signal in response to the command, and the control portion may perform the waveform equalization operation in response to the command.

Further, the image signal transmitter may include a first communication interface portion, the image display unit may include a second communication interface portion an input means, the image signal transmitter may read a program stored in a portable recording medium to operate, image signal transmitter and generate a first reference signal, and transmit a first command for a waveform equalization operation to the image display unit through the communication interface portion, the control portion may perform the waveform equalization operation in response to the first command, and when the input means receives an input for terminating the waveform equalization operation, the input means may transmit a second command containing the contents to the control portion and the image signal transmitter through the first and second interface portions, and the image signal transmitter may stop generating the first reference signal in response to the second command, and the control portion may terminate the waveform equalization operation in response to the second command.

An image signal transmitter of the present invention has a first reference signal generation means for generating a first reference signal, and inserts the first reference signal into each of a plurality of picture signals to be outputted as an image signal.

In this case, the image signal transmitter may read a program stored in a portable recording medium to operate, image signal transmitter and generate the first reference signal according to the program.

To solve the above problems, in the present invention, the reference signal for analyzing the frequency characteristic of the transmission path is transmitted as the image signal for providing a reference, and on the receiving side, waveform equalization portions are provided by the number of signals, the waveform equalization portion analyzes the reference signal to acquire the frequency characteristic by a method such as Fourier transformation, and corrects the frequency characteristic of the transmission path by setting the inverse characteristic to the digital filter.

Therefore, according to the transmission distortion improvement system, correction in the transmission path such as a cable can be performed. Also, ghost block that arises from cross-talk produced between a plurality of cables or inside of an image signal switching device can be similarly improved. In addition, because it also becomes automatically possible to correct group delay characteristics due to the difference in the length of cables between RGB signals, it is possible to correct delay of each of signals in a system in which a plurality of signals are transmitted.

The transmission distortion improvement system can correct variation in outputs of the image signal transmitter, frequency degradation occurring in the transmission path, a difference in delay between signals varied by a cable length and the like, cross-talk produced between cables or inside of an image signal switching device, ringing caused from miss-matching of impedance of the transmission path, and a change in level produced in a video distributor and the like.

Figure 1:
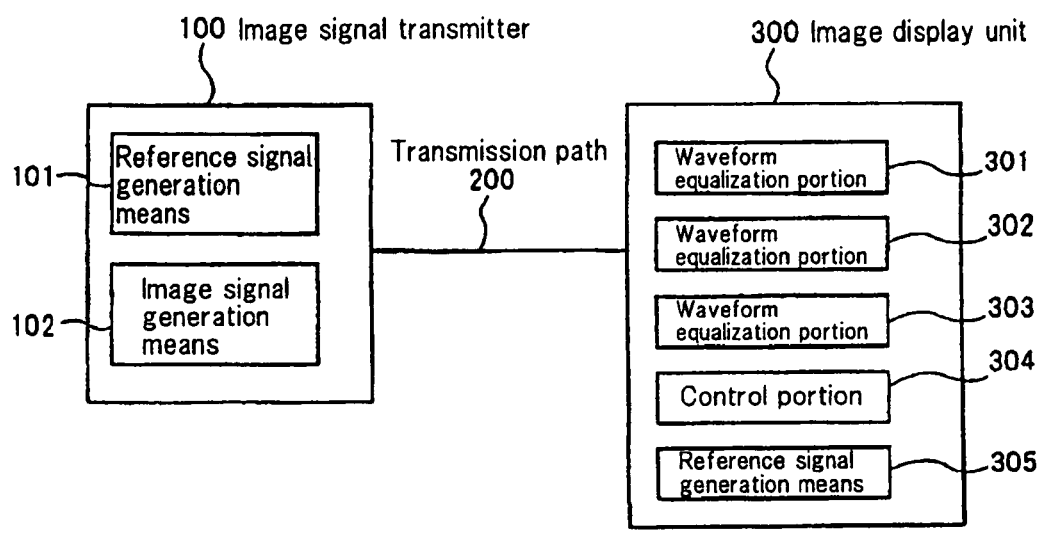
FIG. 1 is a block diagram illustrating a general configuration of one exemplary embodiment of the present invention.

DESCRIPTION OF SYMBOLS 100 image signal transmitter
101 reference signal generation means
102, 305 image signal generation circuit
200 transmission path
300 image display unit
301, 302, 303 waveform equalization portion
801 bandpass filter
802 coring circuit
3011, 3021, 3031 A/D converter
3012, 3022, 3032 FIR filter
3013, 3023, 3033 IIL filter
3014, 3024, 3034 noise reduction circuit
3015, 3025, 3035 memory The above and other objects, features and advantages of the present invention will become apparent from the following description with reference to the accompanying drawings which illustrate examples of the present invention.

Exemplary Embodiment

Next, exemplary embodiments of the present invention will be described with the accompanying drawings.

FIG. 1 is a block diagram illustrating a general configuration of the principal part of one exemplary embodiment of the present invention. The configuration includes: image signal transmitter 100 for outputting RGB image signals of a personal computer (PC), a DVD reproducer and the like; image display unit 300 for displaying images based on the RGB image signals of a projector and the like; and transmission path 200 connecting these.

Image signal transmitter 100 includes: image signal generation circuit 102 for generating RGB image signals and reference signal generation means 101 for generating a reference signal for transmission path analysis. The reference signal generated by reference signal generation means 101 includes an impulse signal shown in FIG. 2(a), a step signal shown in FIG. 2(b), and a sweep signal shown in FIG. 2(c), and the impulse signal and the sweep signal are signals including a flat frequency characteristic, and the step signal has a flat frequency characteristic similar to the impulse signal if a difference corresponding to one clock of the sampling frequency of the reference signal is taken from the step signal. Thus, the reference signal has been a signal that makes it easy to analyze a frequency and that is not susceptible to distortion if clipped before an analyzing means at a level such as a black level and a white level. Reference signal generation means 101 inserts the generated reference signal into each of the RGB image signals generated by image signal generation circuit 102, for example, during a vertical retrace line interval across a plurality of the lines. According to such configuration, by adding and averaging the reference signal across the plurality of lines, the S/N ratio of the reference signal can be improved. Alternatively, the reference signal is inserted during one line, and the reference signal is added and averaged, thereby a similar effect can be provided.

Image display unit 300 has an image display function for displaying an image based on the RGB image signals, and has a common configuration, so that the description and illustration will be omitted. Image display unit 300 includes, besides the image display function, waveform equalization portions 301 to 303 provided for each of an R signal, G signal and B signal constituting the RGB signals, control portion 304 for controlling each waveform equalization portion, and reference signal generation means 305 for generating a reference signal similar to that of reference signal generation means 101 provided in image signal transmitter 100.

Figure 3:
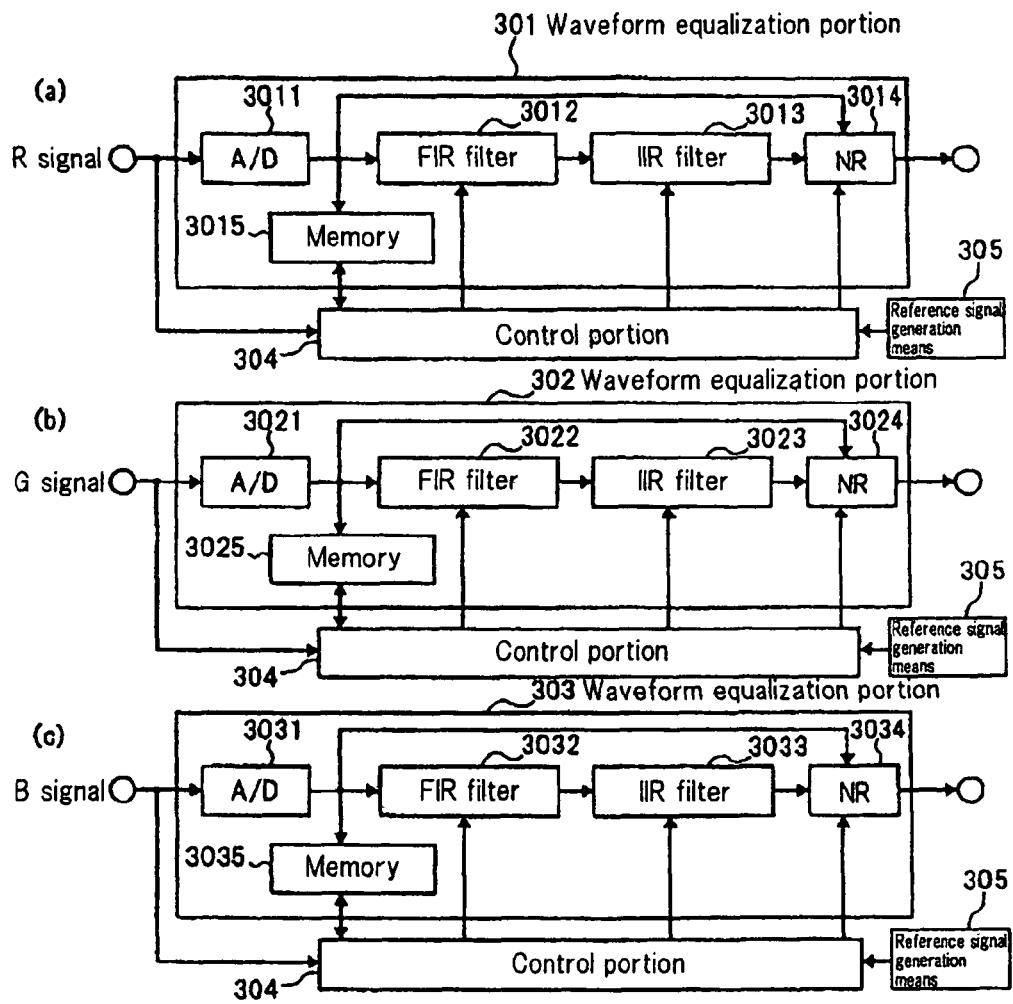
FIGS. 3(a) to 3(c) are circuit diagrams illustrating the relation between waveform equalization portions 301 to 303 and control portion 304 and reference signal generation means 305 in FIG. 1, respectively.

FIGS. 3(a) to 3(c) are circuit diagrams illustrating the relation between each of waveform equalization portions 301 to 303 and control portion 304, and reference signal generation means 305.

Each of waveform equalization portions 301 to 303 inputs the R signal, G signal and B signal, respectively, and includes: A/D converters 3011, 3021 and 3031 for converting the analog signal it into a digital signal; finite impulse response (FIR) filters 3012, 3022 and 3032 for inputting an output of A/D converters 3011, 3021 and 3031; infinite impulse response (IIR) filters 3013, 3023 and 3033 for inputting an output of FIR filters 3012, 3022 and 3032; noise reduction circuits 3014, 3024 and 3034 for inputting an output of IIR filters 3013, 3023 and 3033, and the output of A/D converters 3011, 3021 and 3031; and memory 3015, 3025 and 3035. Memory 3015, 3025 and 3035 is a buffer memory for extracting a first reference signal included in each of the RGB signals. For example, there is provided memory capacity that is sufficient to store the image signal by the amount corresponding to one line, and the signal is compared with a waveform pattern stored in the control portion to determine whether it is the first reference signal or another image signal, and when determined to be the first reference signal, then it used in the control portion.

Figure 4:
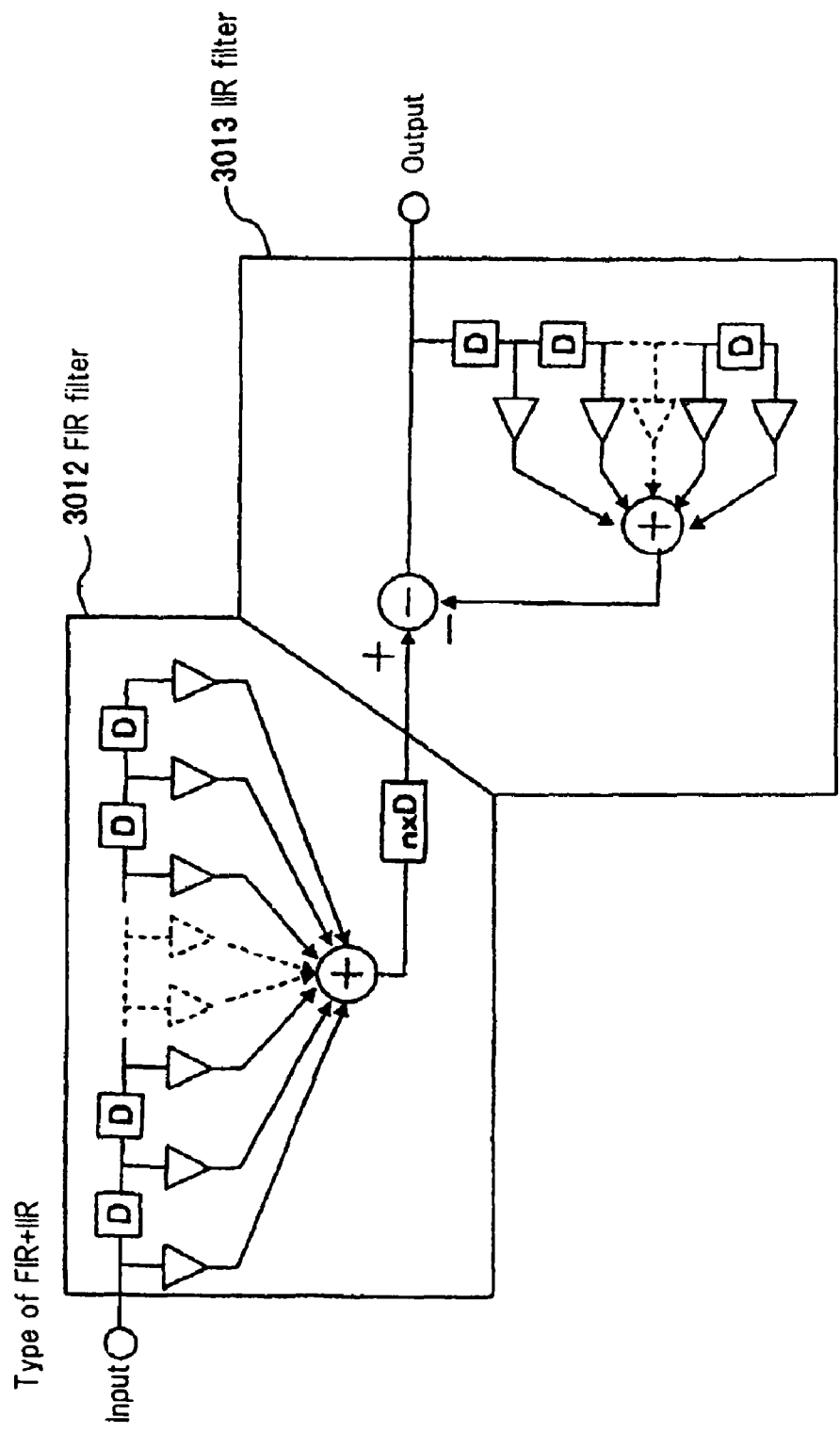
FIG. 4 shows a configuration of FIR filter 3012 and IIR filter 3013 in FIG. 3.

FIR filter 3012 (3022, 3032), whose configuration is shown in FIG. 4, after multiplying each of the outputs of a plurality of registers D that serve as a shift register and that are connected in cascade, when the FIR filter's impulse response may be thought to be finite, act to add together (the output of registers D) and IIR filter 3013 (3023, 3033), in order to correspond to an infinite impulse response, acts to feed back an output of an adder.

Control portion 304 detects the reference signal in the transmitted R signal by means of memory 3015, and compares it with the reference signal generated by reference signal generation means 305 to define a filter coefficient (register D used) of FIR filter 3012 and IIR filter 3013. Because this operation is also carried out similarly for the G signal and B signal, the operation for the R signal will be hereinafter described.

Figure 5:
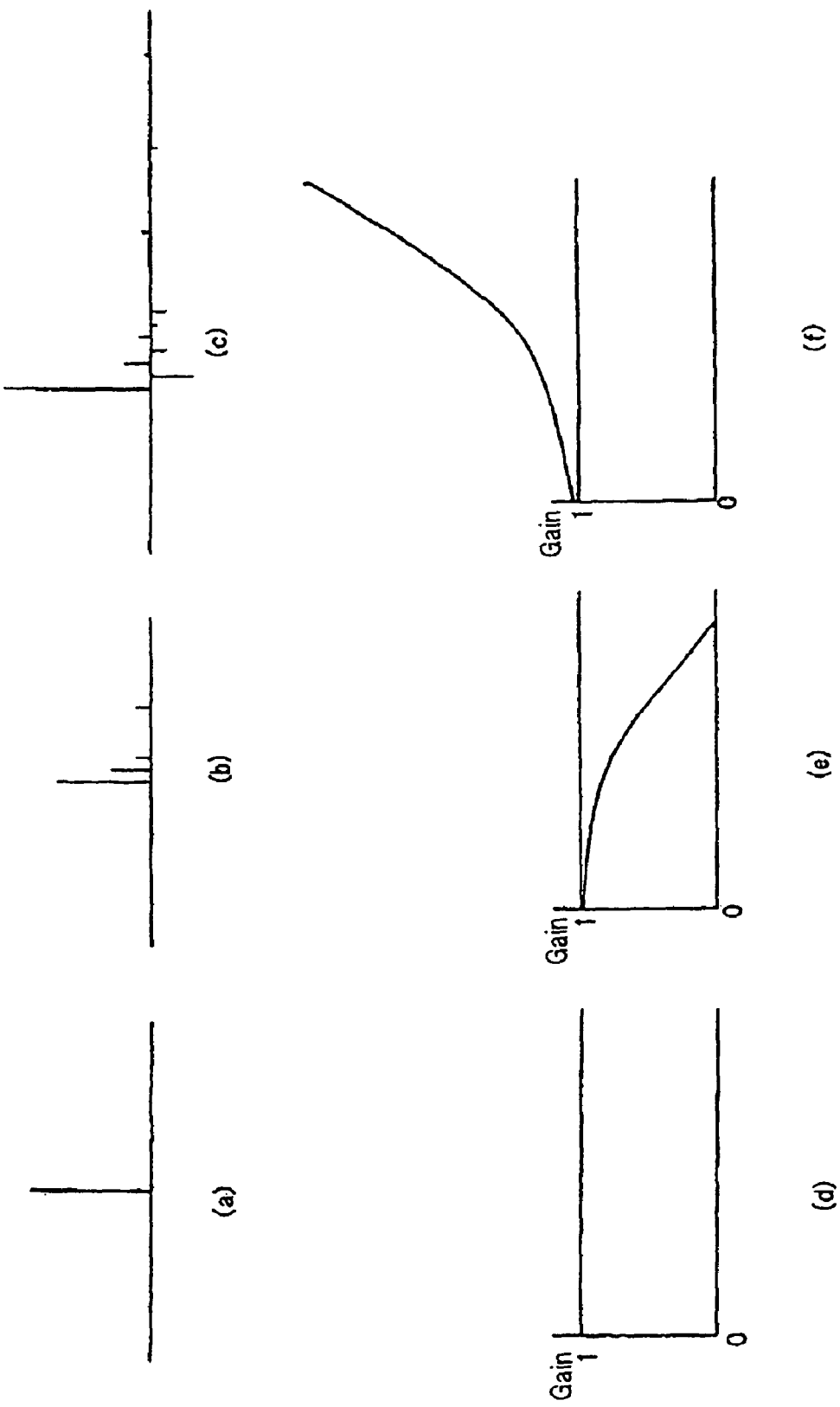
FIG. 5 is a conceptual depiction of a correction performed by control portion 304 in FIG. 3.
Figure 6:
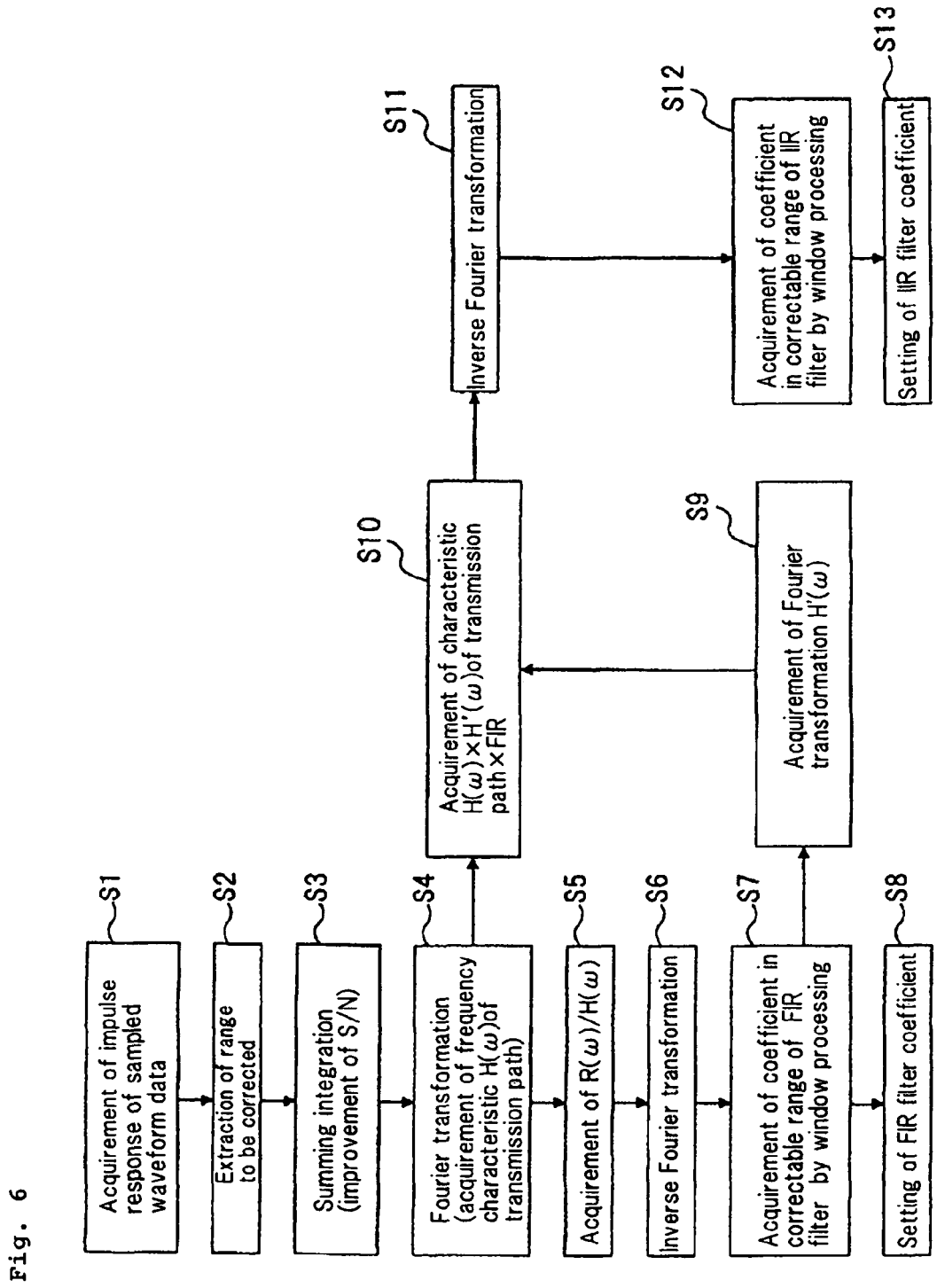
FIG. 6 is a flowchart illustrating operation of control portion 304 in FIG. 3.
Figure 7:
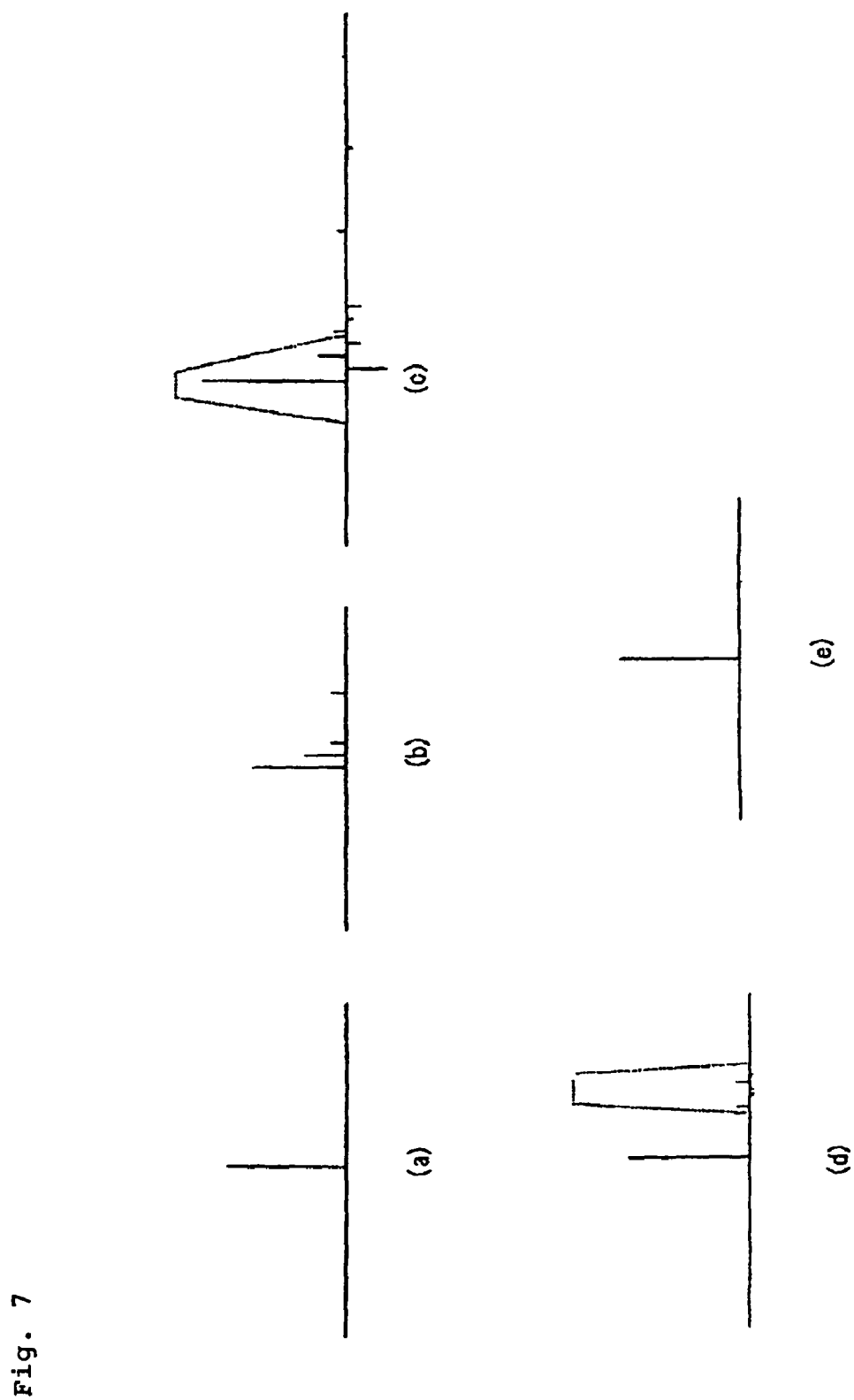
FIG. 7 specifically shows a waveform at each of the key points of the flowchart shown in FIG. 6.

FIG. 5 shows a conceptual depiction of a correction performed by control portion 304 in the present exemplary embodiment. FIG. 6 is a flowchart illustrating the operation of control portion 304. FIG. 7 specifically shows a waveform at each of the key points of the flowchart shown in FIG. 6.

FIG. 5(a) shows the reference signal generated by reference signal generation means 101 and 305 as an impulse signal. FIG. 5(b) shows a distorted waveform of the reference signal generated by reference signal generation means 101 due to transmission through transmission path 200, as an impulse signal. FIG. 5(c) shows an impulse response required to correct the waveform shown in FIG. 5(b). Further, FIG. 5(d) shows a frequency characteristic of the reference signal generated by reference signal generation means 101 and 305. FIG. 5(e) shows a frequency characteristic of the distorted waveform of the reference signal generated by reference signal generation means 101 due to transmission through transmission path 200. FIG. 5(f) shows a correction frequency characteristic that is needed to correct the waveform shown in FIG. 5(b).

Control portion 304 uses in the reference signal which passes through memory 3015, and controls it as follows with reference to the stored data.

Figure 2:
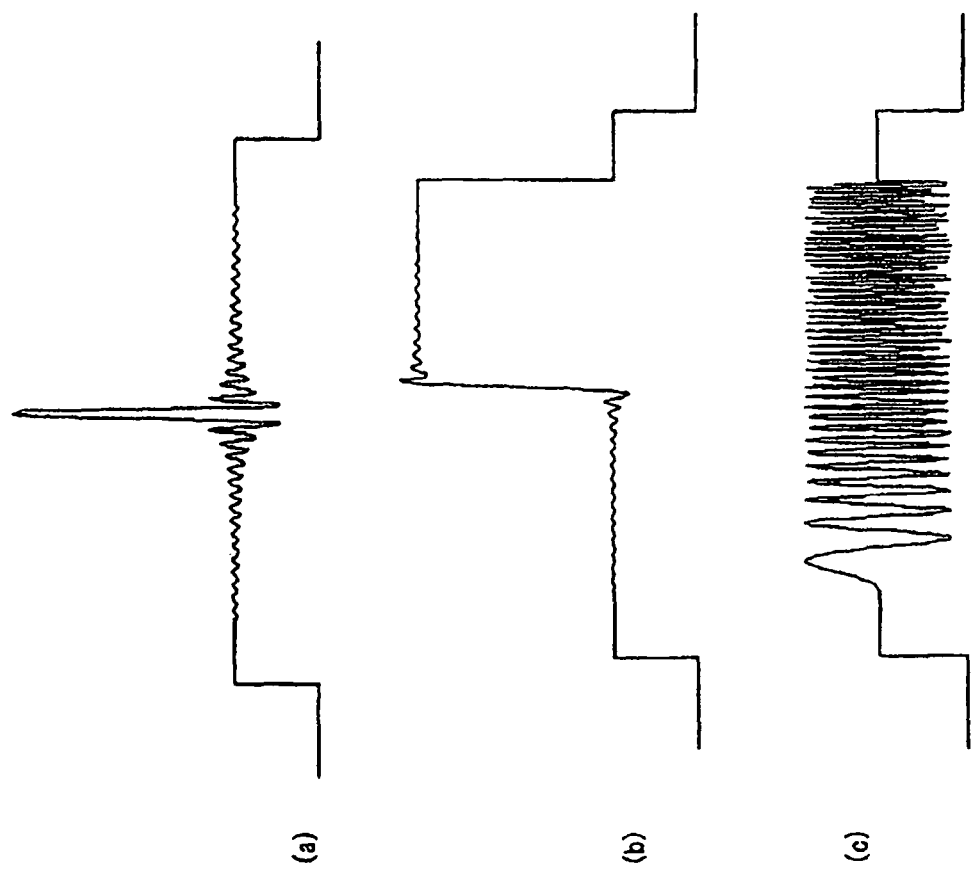
FIGS. 2(a) to 2(c) show a reference signal generated by reference signal generation means 101 in FIG. 1, respectively.

When the reference signal in the R signal is detected as an impulse signal shown in FIG. 7(b), an impulse response of the reference signal shown in FIG. 7(a) is acquired (step S1). At the time of acquiring the impulse response, when the reference signal is the step signal as shown in FIG. 2(b), a difference corresponding to one clock is acquired, and when it is the impulse signal as shown in FIG. 2(a), the reference signal is directly acquired as an impulse signal including one clock width, and when the reference signal is the sweep signal as shown in FIG. 2(c), a signal is acquired by inverting a time axis of the reference signal and computing convolution.

Then, data in the range to be corrected is extracted (step S2), and for the purpose of improving the S/N ratio, summing integration is performed (step S3). Subsequently, a frequency characteristic $H(\omega)$ of the transmission path is acquired (step S4) by Fourier transformation.

Then, the resultant $R(\omega)$ resulting from Fourier transformation of the reference signal is acquired, and $R(\omega)/H(\omega)$ is acquired (step S5). This is because an inverse correction of the transmission path characteristic is $1/H(\omega)$, but it becomes infinite outside of the band of the reference signal, so that $R(\omega)$ is used to the path characteristics. Then inverse Fourier transformation is carried out (step S6), and in FIR filter coefficients that need to be corrected, as shown by the impulse signal in FIG. 7(c), a range surrounded by the dotted line is taken as a window, and a filter coefficient in the range is acquired as a filter coefficient that needs to be corrected (step S7). Then, by selecting the registers D in FIR 3012, the filter coefficient is set (step S8).

Then, we proceed to configure IIR filter 3013. First, $H'(\omega)$ is acquired by computing Fourier transformation of the filter coefficient acquired in step S7 (step S9). Next, $H(\omega) \times H'(\omega)$ as a characteristic of (the transmission path×the FIR) to be corrected by the FIR filter is acquired from $H(\omega)$ acquired in step S4 and from $H'(\omega)$ acquired in step S9 (step S10). That is, a transfer function correcting the characteristic of (the transmission path×the FIR) and realized by the IIR filter is $1/H(\omega) \times H'(\omega)$, and when a transfer function of a transversal filter portion in the IIR filter is indicated by $X(\omega)$, then $1/H(\omega) \times H'(\omega)$ that $=1/(1-X(\omega))$, and $X(\omega)=1-(H(\omega) \times H'(\omega))$ are provided. In window processing required to acquire an IIR filter coefficient, "1" is eliminated, and what is actually acquired is $H(\omega) \times H'(\omega)$.

Then, inverse Fourier transformation is computed (step S11), and in the IIR filter coefficients required to correct as shown by the impulse signal in FIG. 7(d), a range surrounded by the dotted line is taken as a window, and the filter coefficient in this range is acquired as a filter coefficient necessary for correction (step S12). Then, by selecting registers D in IIR filter 3013, the filter coefficient is set (step S13).

In addition, waveform equalization portion 301 has, in addition to memory 3015, a memory portion (not shown) for storing contents set to FIR filter 3012 and to IIR filter 3013 by control portion 304, and the contents that are set to each of the filters in step S8 and step S13 by control portion 304 are stored in the memory portion and executed.

By passing through FIR filter 3012 and IIR filter 3013 to which the filter coefficients are set in a manner described above, the final output shown as an impulse signal in FIG. 7(e) is provided.

Further, although in the exemplary embodiment described above, it has been described that FIR filter 3012 and IIR filter 3013 are used as a filter, FIR filter 3012 may be used. In this case, in the flowchart shown in FIG. 6, steps S1 to S8 are executed.

Figure 8:
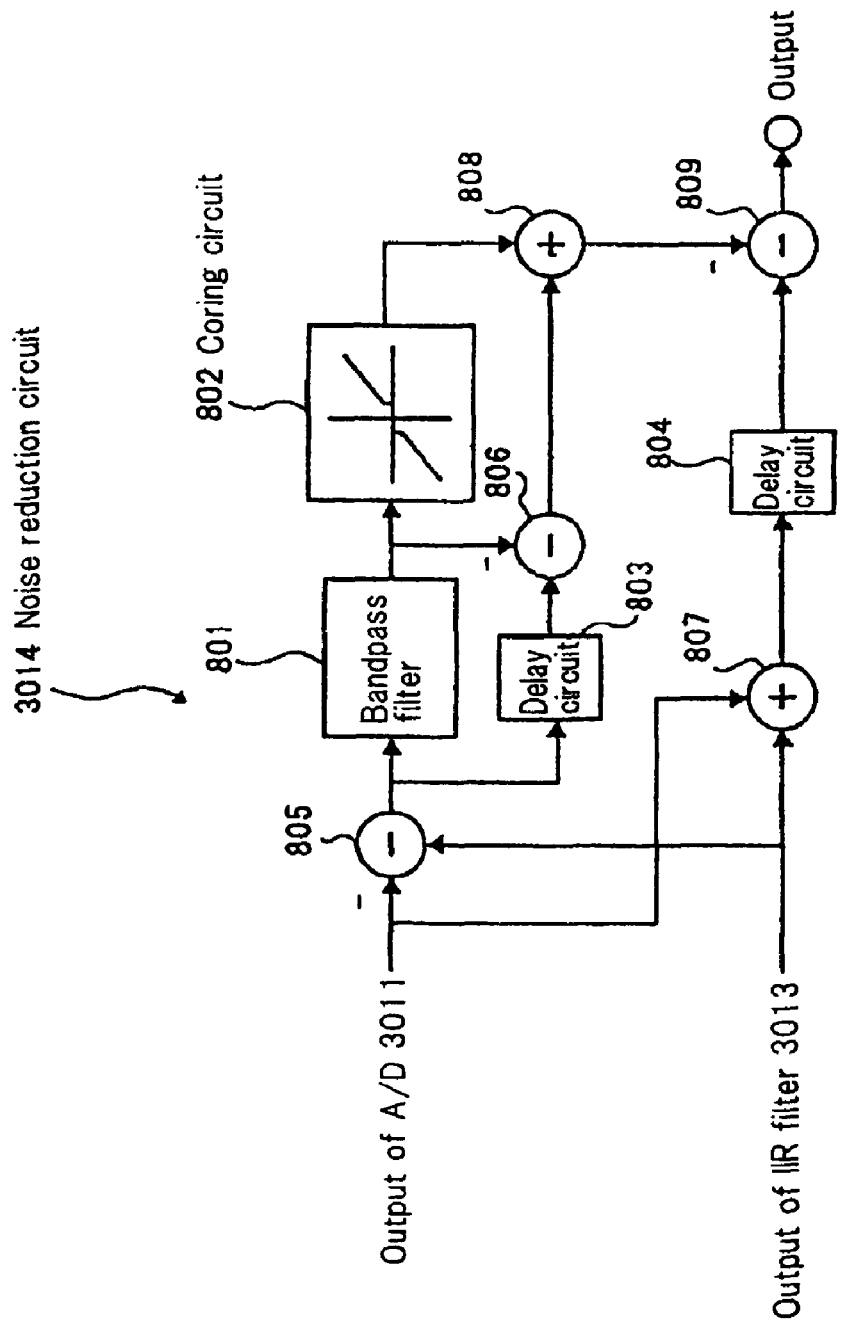
FIG. 8 is a circuit diagram illustrating a configuration of noise reduction circuit 3014 in FIG. 3.

FIG. 8 is a circuit diagram illustrating a configuration of noise reduction circuit 3014. Noise reduction circuit 3014 includes bandpass filter 801, coring filter 802, delay circuits 803 and 804, subtractors 805, 806 and 809, and adders 807 and 808. Subtractor 805 subtracts the output of A/D converter 3011 from the output of the IIR filter, and adder 807 adds the output of the IIR filter to the output of A/D converter 3011.

The IIR filter outputs, as the result of raising the frequency characteristic in a high region for waveform equalization, equalizing signal A on which noise component ΔH including a high-frequency is superimposed. Accordingly, adder 805 outputs noise component ΔH of high-frequency to bandpass filter 801 and delay circuit 803, and adder 807 outputs (2A+ΔH) to delay circuit 804.

Bandpass filter 801 is provided to filer component ΔADC in the vicinity of direct current (DC), and outputs (ΔH-ΔDC) to coring circuit 802 and subtractor 806. In addition, bandpass filter 801 aims to filter out the component in the vicinity of DC, and then it may be a highpass filter.

Coring circuit 802 produces a slice signal by passing a component equal to or larger than a threshold, or equal to or smaller than a threshold in order to filter out a noise. The threshold is varied in response to the amount of frequency boost determined by each filter, and the threshold is made large (small) in response to the boost amount.

Delay circuit 803 is provided to correct the delay time of bandpass filter 801, and subtractor 806 subtracts output (ΔH-ΔDC) of bandpass filter 801 from high-frequency noise component ΔH that is an output of the delay circuit, and outputs component ΔDC in the vicinity of DC to adder 808.

Adder 808 adds (ΔH-ΔDC) cored by coring circuit 802 to component ADC in the vicinity of DC supplied by subtractor 806, and outputs ΔH cored to subtractor 809.

Delay circuit 804 is provided to correct a delay time generated in bandpass filter 801, coring circuit 802 and adder 808, and outputs (2A+ΔH) to subtractor 809.

Subtractor 809 subtracts ΔH cored that is the output of coring circuit 802 from (2A+ΔH) that is the output of delay circuit 804, and outputs signal 2A.

The output of IIR filter 3013 is lowered in the S/N ratio, but when the output is passed through the noise reduction circuit, the S/N ratio is improved.

Next, in the present exemplary embodiment, a description will be provided regarding acquisition of a correction frequency characteristic used at the time of acquiring coefficients in a correctable range of the FIR filter and the IIR filter.

Figure 9:
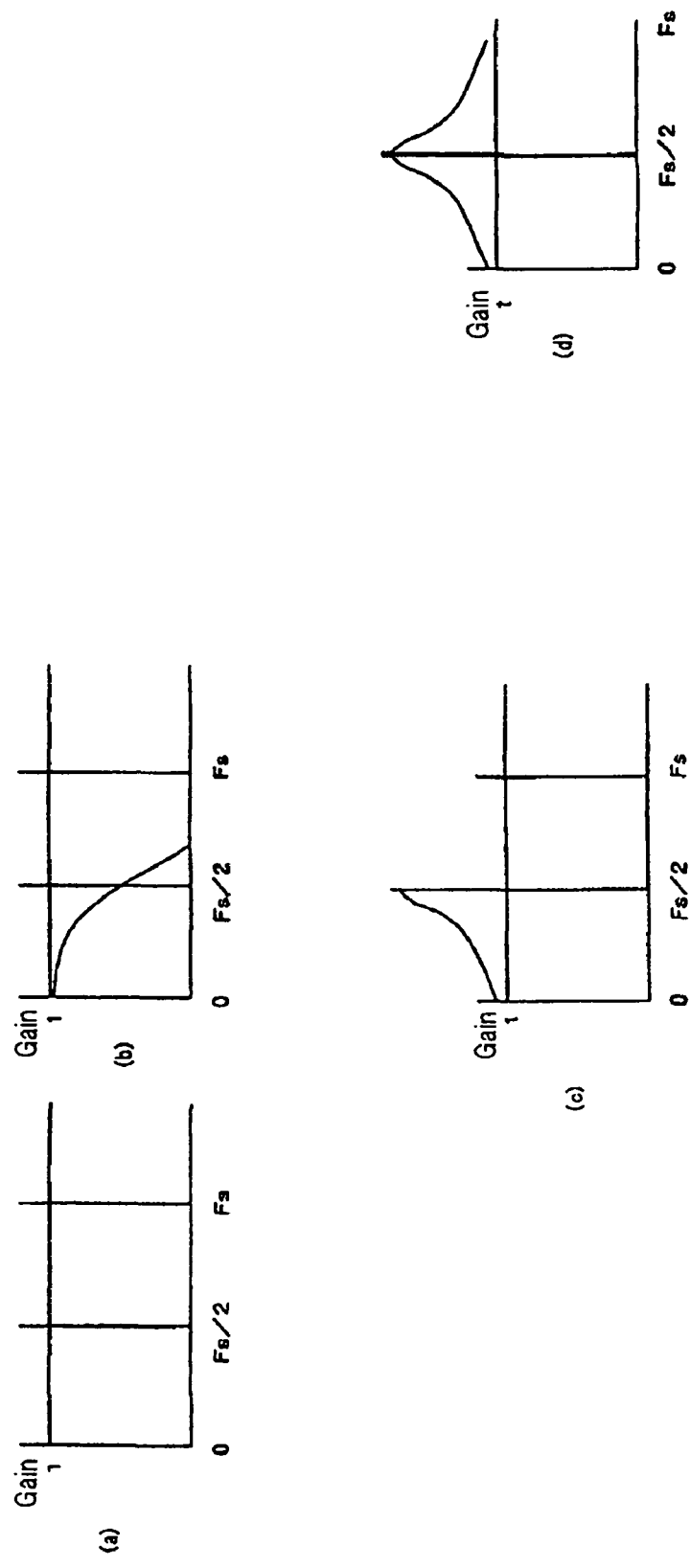
FIG. 9 illustrates how to acquire a correction frequency characteristic when sampling frequency Fs is two times as many as the frequency of a reference signal.

FIG. 9 illustrates how to acquire the correction frequency characteristic when sampling frequency Fs is two times as much as the frequency of the reference signal.

In the present exemplary embodiment, Fs is created by using the sampling frequency of the image signal. At this time, to improve correction performance, sampling at a sampling frequency of n time as many as that of the image signal transmitter, and waveform equalization may be performed, and after waveform equalization, resampling may be performed at the sampling frequency of the image signal transmitter.

Figure 10:
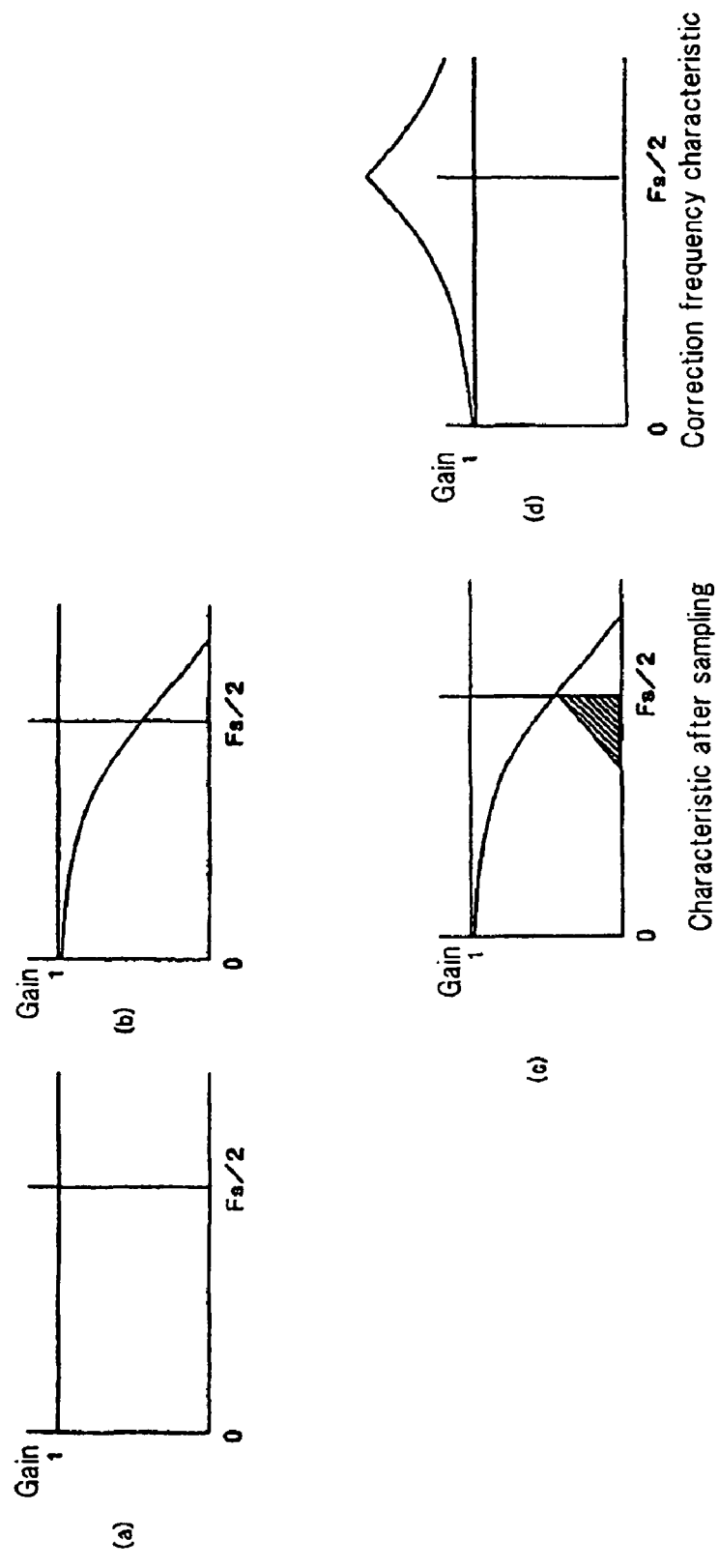
FIG. 10 illustrates how to acquire the correction frequency characteristic when sampling frequency Fs is the same as the frequency of the reference signal.

FIG. 9 shows operation when Fs is set to be two times as many as the sampling frequency of the image signal, and FIG. 10 shows operation when Fs is set to the sampling frequency of the image signal.

Because Fs is two times as much as the sampling frequency of the reference signal whose frequency characteristic is shown in FIG. 9(a), a distorted frequency characteristic of the reference signal due to the transmission process that is shown in FIG. 9(b) can be directly acquired. When the frequency characteristic gradually decreases as shown in FIG. 9(b), a correction frequency characteristic will gradually increase as shown in FIG. 5(f), but in the present exemplary embodiment, a frequency characteristic in a range of equal to or higher than Fs/2 is considered as a harmonic component, and a correction frequency characteristic up to Fs/2 shown in FIG. 9(c) is reflected and added, which provides a correction frequency characteristic shown in FIG. 9(d).

FIG. 10 illustrates how to acquire the correction frequency characteristic when sampling frequency Fs is the same as the frequency of the reference signal.

Because Fs is a frequency of two times as much as that of the reference signal whose frequency characteristic is shown in FIG. 10(a), a reflected spectrum is added to a distorted frequency characteristic of the reference signal due to a transmission process that is shown in FIG. 10(b), which produces an aliasing phenomenon shown by the shaded area in FIG. 10(c). However, because, in this area, in the case of the RGB signals of PCs, the frequency spectrum coincides with that of the original signal, an aliasing noise is not formed, so that the frequency characteristic is directly used as the frequency characteristic of a reference waveform. Also, in the present exemplary embodiment, as described above, regarding the region equal to or larger than Fs/2, the frequency characteristic is considered as a harmonic component, and the correction frequency characteristic up to Fs/2 is reflected and added, so that the correction frequency characteristic is that shown in FIG. 10(d).

Because the image display unit configured as described above of the present exemplary embodiment can continuously perform a waveform equalization process, the optimized image can be constantly displayed when change occurs in the environmental conditions of the transmission path, such as changes in air temperature and humidity, and when the transmission path characteristics deteriorate due to age.

Further, a plurality of image signals is not limited to the RGB signals, and may be a color-difference signal (YCbCr or YPbPr). When the configuration is such that the reference signal is buried in a part of the image signal, as in the present exemplary embodiment, a reference signal in the same frequency band may be used for brightness signal Y and color-difference signal CbCr/PbPr.

Figure 11:
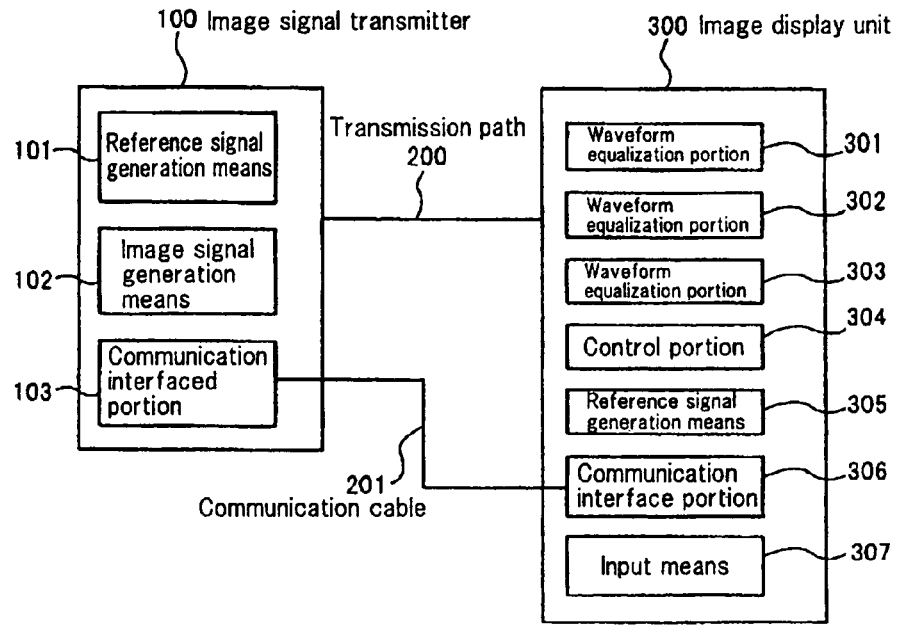
FIG. 11 is a block diagram illustrating a general configuration of a second exemplary embodiment of the present invention.

FIG. 11 is a block diagram illustrating a general configuration of a second exemplary embodiment of the present invention.

The present exemplary embodiment is configured so that image signal transmitter 100 of the first exemplary embodiment is provided with communication interface portion 103, and image display unit 300 is provided with communication interface portion 306 and input means 307.

Reference signal generation means 101, when the power is turned on, or each time that is turned on after a lapse of a predetermined time interval, generates and outputs the reference signal to transmission path 200, and transmits a command for a waveform equalization operation from communication interface portion 103 through communication cable 201 to communication interface portion 306. Control portion 304 receives the command for the waveform equalization operation through communication interface portion 306, and performs the waveform equalization operation. Reference signal generation means 101 stops transmitting the reference signal after a lapse of a sufficient time for control portion 304 to complete the waveform equalization operation, and transmits a command for completion of the waveform equalization operation from communication interface portion 103 through communication cable 201 to communication interface portion 306. Control portion 304 receives the command for completion of the waveform equalization operation through communication interface portion 306, and completes the waveform equalization operation.

Further, the waveform equalization operation is executed upon inputting a command to input means 307. When a user of image display unit 300 inputs a command for a waveform equalization operation to input means 307, a command for the waveform equalization operation is transmitted to control portion 304 and communication interface portion 103 from communication interface portion 306 through communication cable 201. Reference signal generation means 101 receives the command for the waveform equalization operation through communication interface portion 103, and generates the reference signal to be output to transmission path 200. Control portion 304 uses the reference signal that is transmitted to execute the waveform equalization operation. Upon executing this waveform equalization operation, an image display function portion of image display unit 300 may create an on-screen menu indicating the status of the waveform equalization operation, and in response to the contents, the user of image display unit 300 may input a command to input means 307 to proceed.

When a command for completion of the waveform equalization operation is input to input means 307, a command for completion of the waveform equalization operation is transmitted to control portion 304 and communication interface portion 103 from communication interface portion 306 through communication cable 201. Control portion 304 receives the command for completion of the waveform equalization operation, and completes the waveform equalization operation, and reference signal generation means 101 receives the command for completion of the waveform equalization operation through communication interface portion 103, and stops transmitting the reference signal.

Also in the present exemplary embodiment, a plurality of image signals is not limited to the RGB signals, and may be a color-difference signal (YCbCr or YPbPr).

Figure 12:
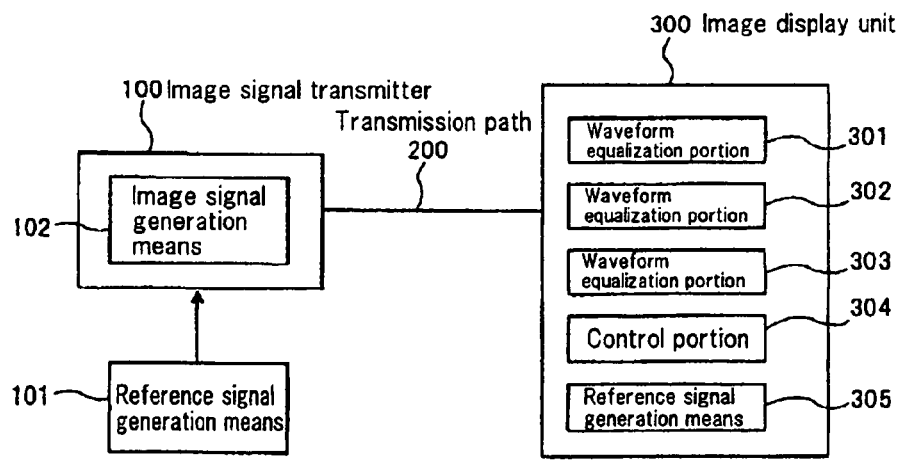
FIG. 12 is a block diagram illustrating a general configuration of a third exemplary embodiment of the present invention.

FIG. 12 is a block diagram illustrating a general configuration of a third exemplary embodiment of the present invention.

In the present exemplary embodiment, image signal transmitter 100 has image signal generation circuit 102 therein, and does not have reference signal generation means 101. Reference signal generation means 101 is a portable medium such as a CD-ROM, DVD-ROM, USB memory, and memory card, and image signal transmitter 100 reads a program stored in these to execute a waveform equalization operations, which allows the reference signal to be transmitted. For image signal transmitter 100, a special device is not necessary, and a general purpose personal computer (PC) can be used. When image signal transmitter 100 or image display unit 300 is adjusted upon the initial installation, image signal transmitter 100 transmits the reference signal generated according to reference signal generation means 101, and image display unit 300 corrects the characteristics of the transmission path by using waveform equalization portions 301 to 303.

Image signal transmitter 100 continues to transmit the reference signal while reference signal generation means 101 is connected. After a lapse of a sufficient time for control portion 304 to complete a waveform equalization process and when reference signal generation means 101 is removed by a user, then image signal transmitter 100 stops transmitting the reference signal.

Also in the present exemplary embodiment, a plurality of image signals, similarly to the first and second exemplary embodiments, is not limited to the RGB signals, and may be color-difference signal (YCbCr or YPbPr). When the reference signal generation means is not built-in as the case of the present exemplary embodiment, the optimized waveform equalization can be performed by individually providing a reference signal in a suitable frequency band for the reference signal for brightness signal Y and for the reference signal for color-difference signal CbCr/PbPr, respectively.

Figure 13:
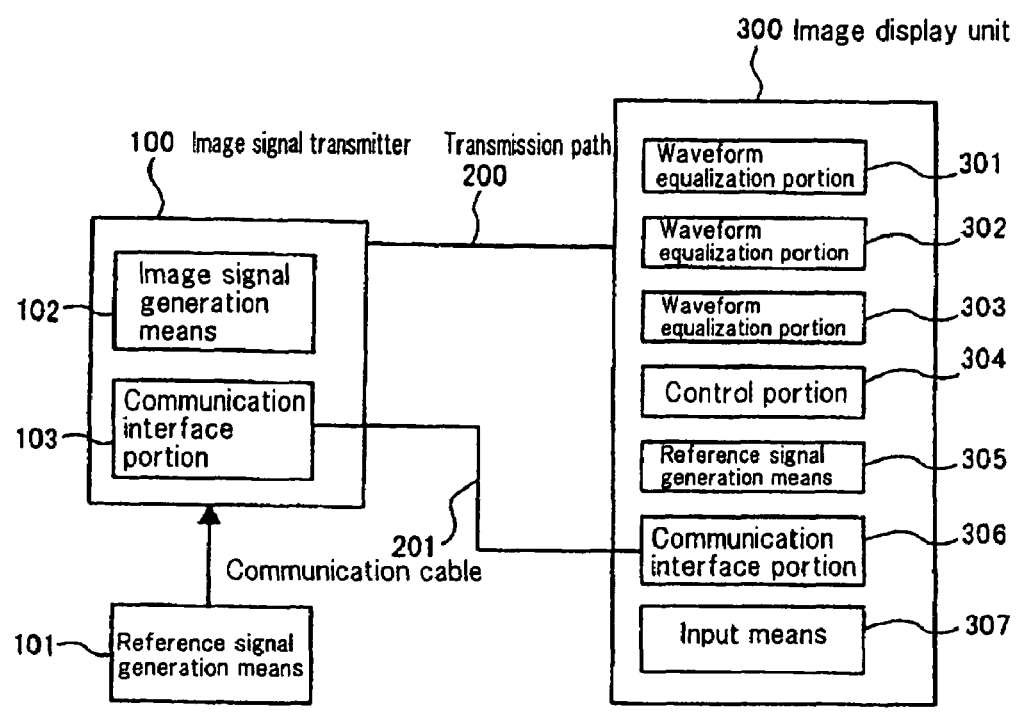
FIG. 13 is a block diagram illustrating a general configuration of a fourth exemplary embodiment of the present invention.

FIG. 13 is a block diagram illustrating a general configuration of a fourth exemplary embodiment of the present invention.

In the present exemplary embodiment, image signal transmitter 100 of the third exemplary embodiment shown in FIG. 12 is provided with communication interface portion 103, and image display unit 300 is provided with communication interface portion 306 and input means 307.

Also in the present exemplary embodiment, image signal transmitter 100 has image signal generation circuit 102, and does not have reference signal generation means 101. Reference signal generation means 101 is a portable medium such as a CD-ROM, DVD-ROM, USB memory, and memory card, and image signal transmitter 100 reads a program stored in these to execute a waveform equalization operation, which allows the reference signal to be transmitted. For image signal transmitter 100, a special device is not necessary, and a general purpose personal computer (PC) can be used.

Image signal transmitter 100 transmits, from image signal generation means 102 to transmission path 200, an image signal indicating an on-screen menu showing that it is ready to execute a waveform equalization operation by using the program stored in reference signal generation means 101, and generates the reference signal to insert it into the image signal. When a user of image display unit 300 inputs a command for the waveform equalization operation to input means 307, a command for the waveform equalization operation is transmitted to control portion 304. Control portion 304 executes the waveform equalization operation using the reference signal transmitted.

When a command for completion of the waveform equalization operation is input to input means 307, a command for completion of the waveform equalization operation is transmitted to control portion 304 and to communication interface portion 103 from communication interface portion 306 through communication cable 201. Control portion 304 receives the command for completion of the waveform equalization operation, and completes the waveform equalization operation, and when image signal transmitter 100 receives the command for completion of the waveform equalization operation through communication interface portion 103, then image signal transmitter 100 makes image signal generation means 102 transmit, to the transmission path, an image signal indicating an on-screen menu showing completion of the waveform equalization operation, and stops inserting the reference signal into the image signal.

In addition, similarly to the first to third exemplary embodiments, a plurality of image signals is not limited to the RGB signals, and may be a color-difference signal (YCbCr or YPbPr).

When the waveform equalization operation is not executed in sequence, the sampling frequency of the image display unit may be changed after executing the waveform equalization operation. At this time, instead of executing the waveform equalization operation again to acquire the filter coefficient for correction suitable for a new sampling frequency, the filter coefficient may be acquired by an interpolation process.

Figure 14:
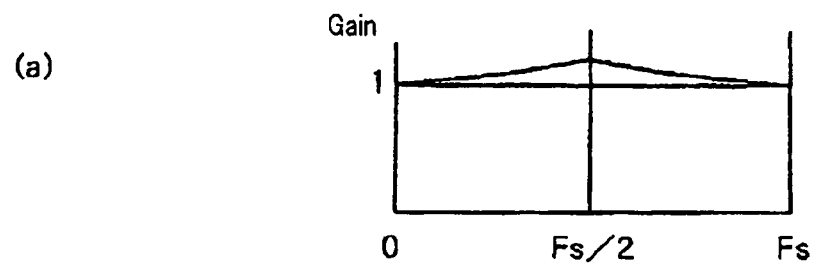
FIGS. 14(a) to 14(d) illustrate interpolation, respectively.
Figure 14:
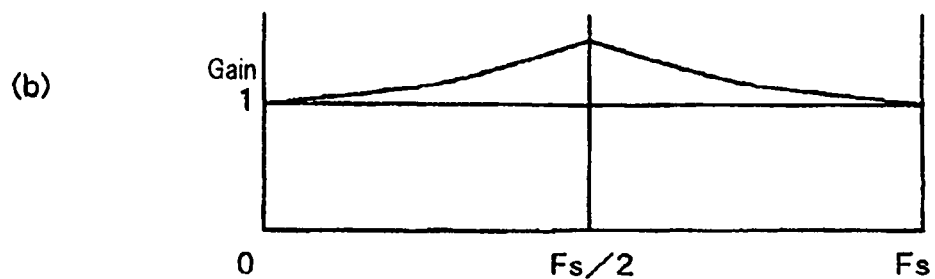
Figure 14:
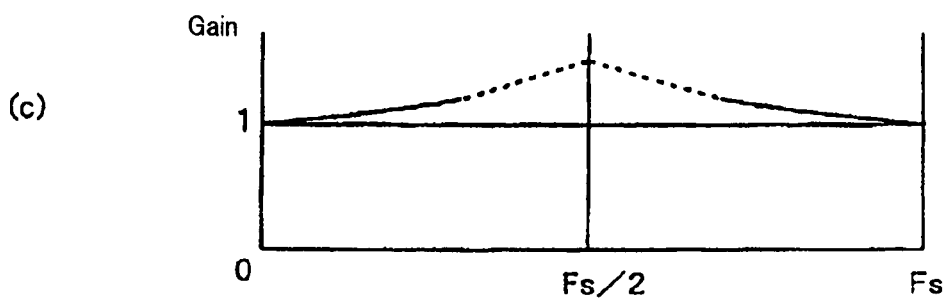
Figure 14:
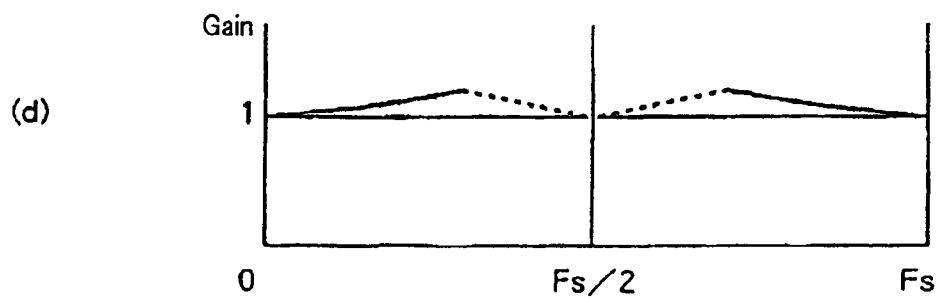

The above interpolation process will be described with reference to FIG. 14.

First, at adjustment of the initial installation of equipment, the reference signal is transmitted from image signal transmitter 100. Image display unit 300 executes the waveform equalization process of the transmission path using the correction frequency characteristic shown in FIG. 14($a$), assuming that the received signal has the resolution of XGA (1024×768) and a vertical synchronizing frequency of 60 Hz. At this time, the sampling frequency in the image display unit is 65 MHz.

Subsequently, the sampling frequency of image display unit 300 is changed to 108 MHz for a signal including SXGA (1280×1024) and a vertical frequency of 60 Hz, and necessary the correction frequency characteristic turns into that shown in FIG. 14(b), then the filter coefficient optimized upon receiving the correction frequency XGA cannot provide a sufficient waveform equalization effect.

Then, in the present exemplary embodiment, control portion 304 includes a memory portion (not shown) for storing the correction frequency characteristic, and the correction frequency characteristic up to 65 MHz/2 that is acquired upon receiving XGA is stored in the memory portion of control portion 304, and the characteristic up to 65 MHz/2 that is acquired upon receiving XGA as shown by the solid line in FIG. 14(c) is extended to 108 MHz/2 and the filter coefficient is interpolated, as shown by the dotted line in FIG. 14(c), thereby the above problem can be solved. Alternatively, as shown by the solid line in FIG. 14(d), the characteristic up to 65 MHz/2 that is acquired upon receiving XGA may be directly used, and the filter coefficient may be acquired so that a gain equals 1 at 108 MHz/2 as shown by the dotted line in FIG. 14(d).

Next, a gain adjustment executed in each of the exemplary embodiments described above will be described. When a DC gain of the correction frequency characteristic in the frequency axis or the sum total of the filter coefficients that are actually applied to the FIR filter is assumed to be "G", the A/D converter is amplified by a value obtained by multiplying a normal gain set value by G, and the coefficient that is actually applied to FIR filter 3012 is multiplied by 1/G (the correction characteristic may be entirely multiplied by 1/G in a frequency region). This allows degradation of the S/N ratio of A/D conversion to be reduced when a small level is input.

As mentioned above, the invention in this application has been described with reference to the exemplary embodiments, but the invention in this application is not limited to the exemplary embodiments described above. Anyone skilled in the art can make various changes that fall within the scope of the invention in this application to configurations and/or details of the invention in this application.

Benefit of priority is hereby claimed based on Japanese Patent Application No. 2007-045634, filed on Feb. 26, 2007, which disclosure is herein incorporated by reference in its entirety.

The invention claimed is:

1. An image display unit including a first reference signal generation means for generating a first reference signal, that constitutes an image display system along with an image signal transmitter for inserting the first reference signal into each of a plurality of picture signals to output as an image signal, that inputs the image signal through a transmission path, and that displays an image based on the image signal, comprising:
    a second reference signal generation means for generating a second reference signal similar to that of the first reference signal generation means;
    a plurality of waveform equalizers provided that correspond to the plurality of picture signals and that include a filter circuit capable of setting a characteristic thereto; and
    a control portion for inputting the plurality of picture signals, analyzing a characteristic of a transmission path between the image signal transmitter and the image display unit upon detecting the first reference signal in the input picture signals by comparing the first reference signal with the second reference signal, and setting a characteristic inverse to the analyzed characteristic of the transmission path to a filter circuit of the waveform equalizers that corresponding to the input picture signals,
    wherein each of the waveform equalizers includes a noise reduction circuit for correcting degradation in S/N ratio due to the filter circuit,
    the noise reduction circuit has a variable correction amount, and
    the control portion adjusts the correction amount by using the noise reduction circuit corresponding to the characteristic set to the filter circuit.

2. The image display unit according to claim 1, wherein the first and second reference signals generated by the first and second reference signal generation means include at least any one from among a sweep signal, an impulse signal and a step signal.

3. The image display unit according to claim 1, wherein the filter circuit comprises a finite impulse response (FIR) filter.

4. The image display unit according to claim 1, wherein the filter circuit comprises an FIR filter and an infinite impulse response (IIR) filter.

5. The image display unit according to claim 1, wherein a waveform equalization circuit includes an A/D converter for converting the image signal into a digital signal to output to the filter circuit, and
the control portion sets a gain of G to the A/D converter, and applies a gain of 1/G to a filter coefficient of the filter circuit.

6. The image display unit according to claim 1, wherein the waveform equalizer includes a memory portion for storing contents set to the filter circuit by the control portion, and
the control portion sets contents to the filter circuit by using the stored contents in the memory portion.

7. The image display unit according to claim 1, wherein the control portion performs sampling operations at a sampling frequency of n times as much as a sampling frequency of the image signal to acquire in order to execute waveform equalization, and subsequently performs resampling to apply a correction frequency characteristic to the correction frequency characteristic of the image signal.

8. The image display unit according to claim 1, wherein the control portion acquires a correction frequency characteristic to execute waveform equalization up to one-half of a sampling frequency of the first reference signal, and
the correction frequency characteristic beyond this is acquired by interpolation.

9. The image display system according to claim 8, wherein the image signal transmitter reads a program stored in a portable recording medium to operate, image signal transmitter and generates the first reference signal.

10. The image display system according to claim 8, wherein
the image signal transmitter and the image display unit both have a communication interface portion,
the image signal transmitter reads a program stored in a portable recording medium to operate, image signal transmitter and generates the first reference signal, and transmits a command for a waveform equalization operation to the image display unit through the communication interface portion, and the control portion performs the waveform equalization operation in response to the command.

11. The image display system according to claim 8, wherein the image signal transmitter includes a first communication interface portion, the image display unit includes a second communication interface portion and an input means, when the input means receives an input for a waveform equalization operation, the input means transmits a command containing the contents to the control portion and to the image signal transmitter through the first and second interface portions, the image signal transmitter generates the first reference signal in response to the command, and the control portion performs the waveform equalization operation in response to the command.

12. The image display system according to claim 8, wherein the image signal transmitter includes a first communication interface portion, the image display unit includes a second communication interface portion and an input means, the image signal transmitter reads a program stored in a portable recording medium to operate, image signal transmitter and generates a first reference signal, and transmits a first command for a waveform equalization operation to the image display unit through the communication interface portion, the control portion performs the waveform equalization operation in response to the first command, when the input means receives an input for terminating the waveform equalization operation, the input means transmits a second command containing the contents to the control portion and to the image signal transmitter through the first and second interface portions, the image signal transmitter stops generating the first reference signal in response to the second command, and the control portion terminates the waveform equalization operation in response to the second command.

13. The image display unit according to claim 1, wherein the control portion has a memory portion for storing the correction frequency characteristic to execute waveform equalization, acquires the correction frequency characteristic beyond one-half of the sampling frequency of the reference signal by interpolation using the correction frequency characteristic stored in the memory portion when a frequency of the image signal becomes higher than that of the reference signal after setting the characteristic inverse to the analyzed transmission path characteristic to the filter circuit, directly applies the correction frequency characteristic of up to one-half of the sampling frequency stored in the memory portion to the correction frequency characteristic of up to one-half of the sampling frequency of the reference signal when the frequency of the image signal becomes lower than that of the reference signal, and executes waveform equalization using the correction frequency characteristic acquired in such a manner.

14. An image display system including an image signal transmitter for outputting an image signal including a plurality of picture signals, and an image display unit for inputting the image signal through a transmission path and for displaying the image based on the image signal, wherein the image signal transmitter has a first reference signal generation means for generating a first reference signal, and inserts the first reference signal into each of the plurality of picture signals to output as the image signal, the image display unit comprising:

a second reference signal generation means for generating a second reference signal similar to that of the first reference signal generation means, a plurality of waveform equalizers provided that correspond to the plurality of picture signals and that include a filter circuit capable of setting a characteristic thereto, and a control portion for inputting the plurality of picture signals, analyzing a characteristic of a transmission path between the image signal transmitter and the image display unit upon detecting the first reference signal in the input picture signals by comparing the first performance signal with the second reference signal, and setting a characteristic inverse to the analyzed characteristic of the transmission path of a filter circuit of the waveform equalizers that corresponds to the input picture signals, wherein each of the waveform equalizers includes a noise reduction circuit for correcting degradation in S/N ratio due to the filter circuit, the noise reduction circuit has a variable correction amount, and the control portion adjusts the correction amount by using the noise reduction circuit corresponding to the characteristic set to the filter circuit.

15. An image display unit including a first reference signal generation means for generating a first reference signal, that constitutes an image display system along with an image signal transmitter for inserting the first reference signal into each of a plurality of picture signals to output as an image signal, that inputs the image signal through a transmission path, and that displays an image based on the image signal, comprising:

a second reference signal generation means for generating a second reference signal similar to that of the first reference signal generation means;

a plurality of waveform equalizers provided that correspond to the plurality of picture signals and that include a filter circuit capable of setting a characteristic thereto; and a control portion for inputting the plurality of picture signals, analyzing a characteristic of a transmission path between the image signal transmitter and the image display unit upon detecting the first reference signal in the input picture signals by comparing the first reference signal with the second reference signal, and setting a characteristic inverse to the analyzed characteristic of the transmission path to a filter circuit of the waveform equalizers that corresponding to the input picture signals, wherein each of the waveform equalizers includes a noise reduction circuit for correcting degradation in S/N ratio due to the filter circuit, the noise reduction circuit has a variable correction amount, and the control portion adjusts the correction amount by using the noise reduction circuit corresponding to the characteristic set to the filter circuit.

16. An image display unit including a first reference signal generation means for generating a first reference signal, that constitutes an image display system along with an image signal transmitter for inserting the first reference signal into each of a plurality of picture signals to output as an image signal, that inputs the image signal through a transmission path, and that displays an image based on the image signal, comprising:

a second reference signal generation means for generating a second reference signal similar to that of the first reference signal generation means;

a plurality of waveform equalizer means provided that correspond to the plurality of picture signals and that include a filter circuit capable of setting a characteristic thereto; and a control means for inputting the plurality of picture signals, analyzing a characteristic of a transmission path between the image signal transmitter and the image display unit upon detecting the first reference signal in the input picture signals by comparing the first reference signal with the second reference signal, and setting a characteristic inverse to the analyzed characteristic of the transmission path to a filter circuit of the waveform equalizer means that corresponding to the input picture signals, wherein each of the waveform equalizers means includes a noise reduction circuit for correcting degradation in S/N ratio due to the filter circuit, the noise reduction circuit has a variable correction amount, and the control portion adjusts the correction amount by using the noise reduction circuit corresponding to the characteristic set to the filter circuit.

17. An image display method, which executed in an image display unit including a first reference signal generation means for generating a first reference signal, that constitutes an image display system along with an image signal transmitter for inserting the first reference signal into each of a plurality of picture signals to output as an image signal, that inputs the image signal through a transmission path, and that displays an image based on the image signal, comprising:

generating a second reference signal similar to that of the first reference signal generation means;

provide a plurality of waveform equalizers that correspond to the plurality of picture signals and that include a filter circuit capable of setting a characteristic thereto; and inputting the plurality of picture signals, analyzing a characteristic of a transmission path between the image signal transmitter and the image display unit upon detecting the first reference signal in the input picture signals by comparing the first reference signal with the second reference signal, and setting a characteristic inverse to the analyzed characteristic of the transmission path to a filter circuit of the waveform equalizers that corresponding to the input picture signals, wherein each of the waveform equalizers includes a noise reduction circuit for correcting degradation in S/N ratio due to the filter circuit, the noise reduction circuit has a variable correction amount, and the control portion adjusts the correction amount by using the noise reduction circuit corresponding to the characteristic set to the filter circuit.

\* \* \* \* \*